(12) United States Patent
Barmichev et al.

(10) Patent No.: US 11,834,148 B2
(45) Date of Patent: Dec. 5, 2023

(54) CARGO AIRCRAFT SYSTEM AND RELATED METHOD FOR LOADING ELONGATE CARGO THEREIN

(71) Applicant: The Boeing Company, Chicago, IL (US)

(72) Inventors: Sergey Barmichev, Kirkland, WA (US); Zarir Pastakia, Seattle, WA (US); Mithra Sankrithi, Bremerton, WA (US)

(73) Assignee: The Boeing Company, Arlington, VA (US)

( * ) Notice: Subject to any disclaimer, the term of this patent is extended or adjusted under 35 U.S.C. 154(b) by 114 days.

(21) Appl. No.: 17/528,838

(22) Filed: Nov. 17, 2021

(65) Prior Publication Data

US 2023/0150647 A1    May 18, 2023

(51) Int. Cl.
   *B64C 1/22*    (2006.01)
   *B64C 1/14*    (2006.01)

(52) U.S. Cl.
   CPC .............. *B64C 1/22* (2013.01); *B64C 1/1415* (2013.01)

(58) Field of Classification Search
   CPC ................................ B64C 1/22; B64C 1/1415
   See application file for complete search history.

(56) References Cited

U.S. PATENT DOCUMENTS

| | | | | |
|---|---|---|---|---|
| 3,009,672 A * | 11/1961 | Tharratt | ................ | B64C 1/1415 403/119 |
| 4,301,984 A * | 11/1981 | Olason | .................... | B64D 9/00 410/1 |
| 8,608,110 B2 * | 12/2013 | Helou, Jr. | ............... | B64C 39/02 244/137.1 |
| 8,708,282 B2 * | 4/2014 | Helou, Jr. | ............... | B64C 39/02 244/119 |
| 11,148,780 B2 * | 10/2021 | Oonnoonny | ............ | B64C 1/069 |
| 2006/0108477 A1 * | 5/2006 | Helou | ..................... | B64C 1/061 244/137.1 |
| 2007/0025832 A1 * | 2/2007 | Rawdon | ................... | B64D 9/00 414/401 |
| 2010/0252682 A1 * | 10/2010 | Pahl | ......................... | B64C 1/22 244/129.5 |
| 2020/0122835 A1 * | 4/2020 | Daw Perez | .............. | B64C 1/20 |

* cited by examiner

*Primary Examiner* — Justin M Benedik
(74) *Attorney, Agent, or Firm* — Womble Bond Dickinson (US) LLP

(57) ABSTRACT

A cargo aircraft is disclosed, and may include a fuselage defining a longitudinally-extending cargo compartment and including: an elongate cylindrical portion, longitudinally-opposed forward and rearward ends, and laterally-opposed first and second sides, and a forward portion engaged with the forward end of the cylindrical portion, the fuselage defining a continuous cargo opening to the cargo compartment along the first side, the cargo opening having a first portion extending along the cylindrical portion to a rearward edge and a second portion extending along the forward portion to a forward edge, wherein an increased distance of the forward edge from the forward end of the cylindrical portion allows an elongate cargo item to be obliquely inserted lengthwise through the cargo opening from the forward edge at a decreased acute loading angle between the elongate cargo item and the lateral centerline.

20 Claims, 15 Drawing Sheets

48 

Figure 1:
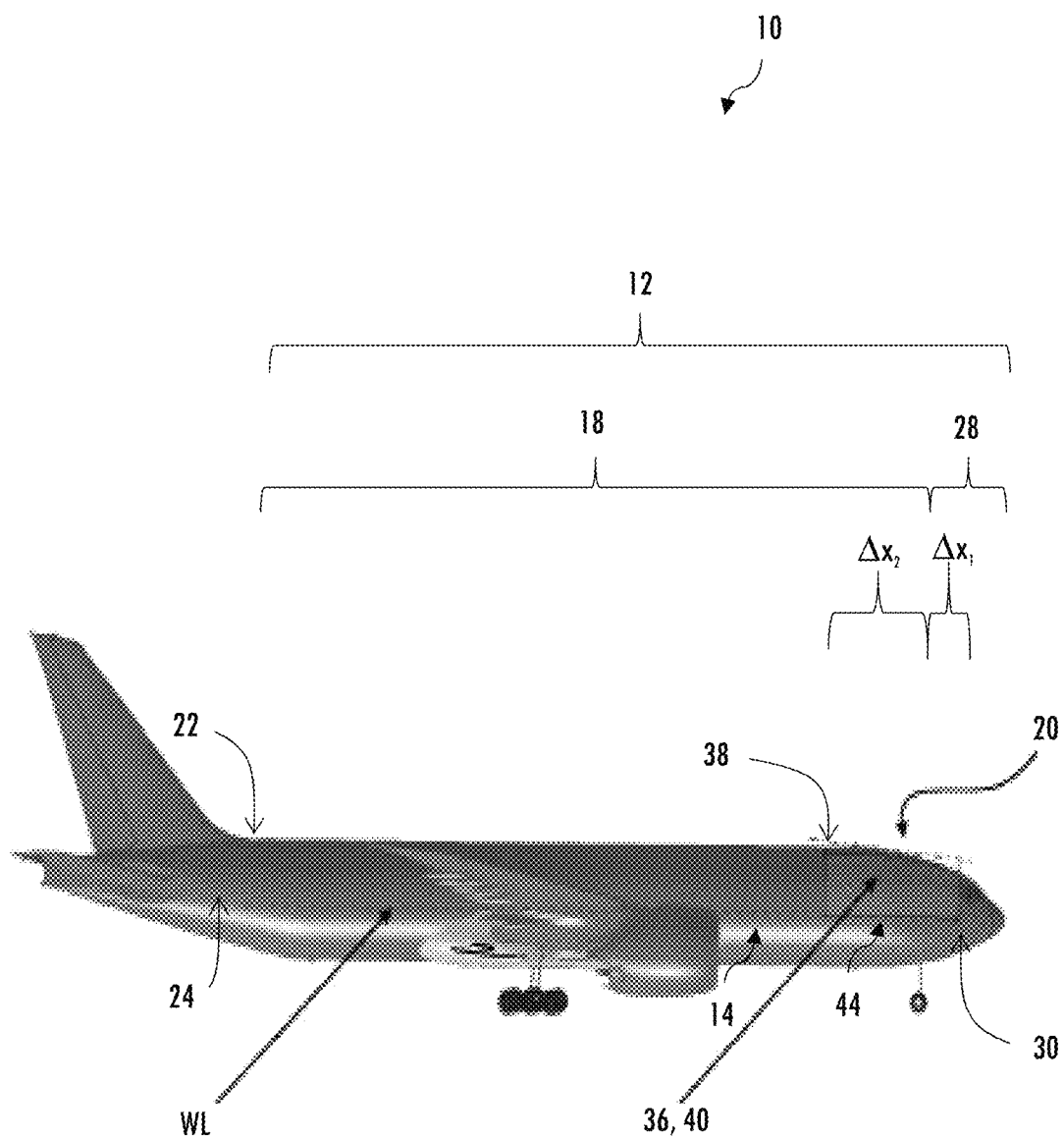

INSERTING A FIRST ELONGATE CARGO ITEM LENGTHWISE INTO THE CARGO COMPARTMENT OBLIQUELY THROUGH A CONTINUOUS CARGO OPENING DEFINED BY THE FUSELAGE ALONG THE FIRST SIDE, THE CARGO OPENING HAVING A FIRST PORTION EXTENDING ALONG THE CYLINDRICAL PORTION TO A REARWARD EDGE AND A SECOND PORTION EXTENDING ALONG THE FORWARD PORTION TO A FORWARD EDGE, THE OBLIQUE LENGTHWISE INSERTION OF THE FIRST ELONGATE CARGO ITEM THROUGH THE CARGO OPENING BEING INITIATED FROM THE FORWARD EDGE AT AN ACUTE ANGLE BETWEEN THE FIRST ELONGATE CARGO ITEM AND THE LATERAL CENTERLINE  50

FIG. 6

FIG. 8A
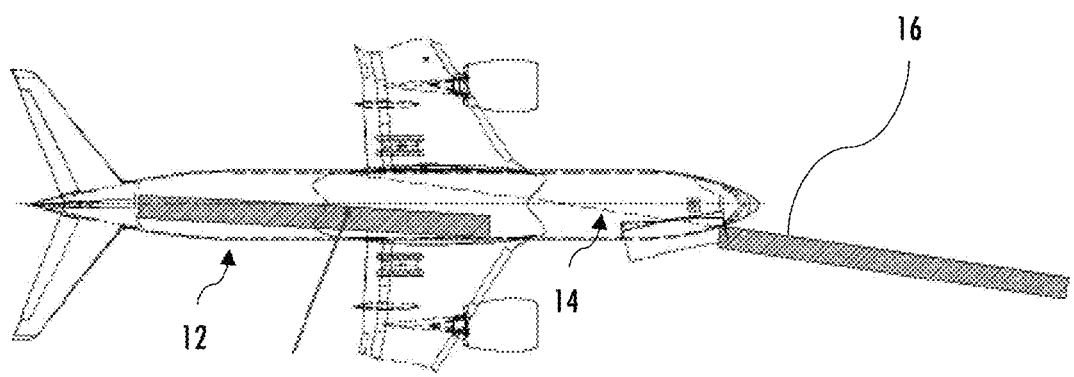
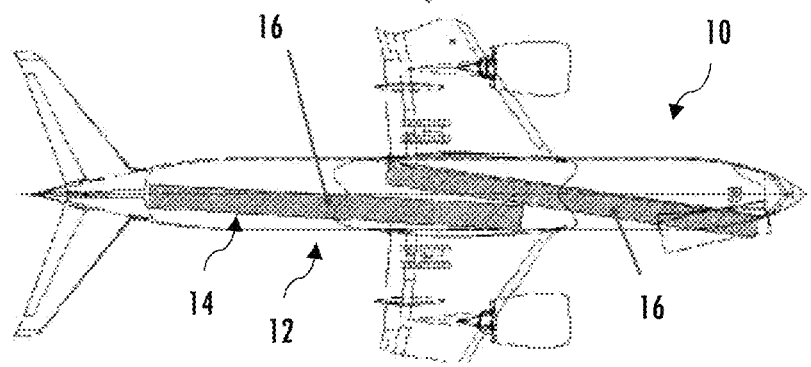
FIG. 8B

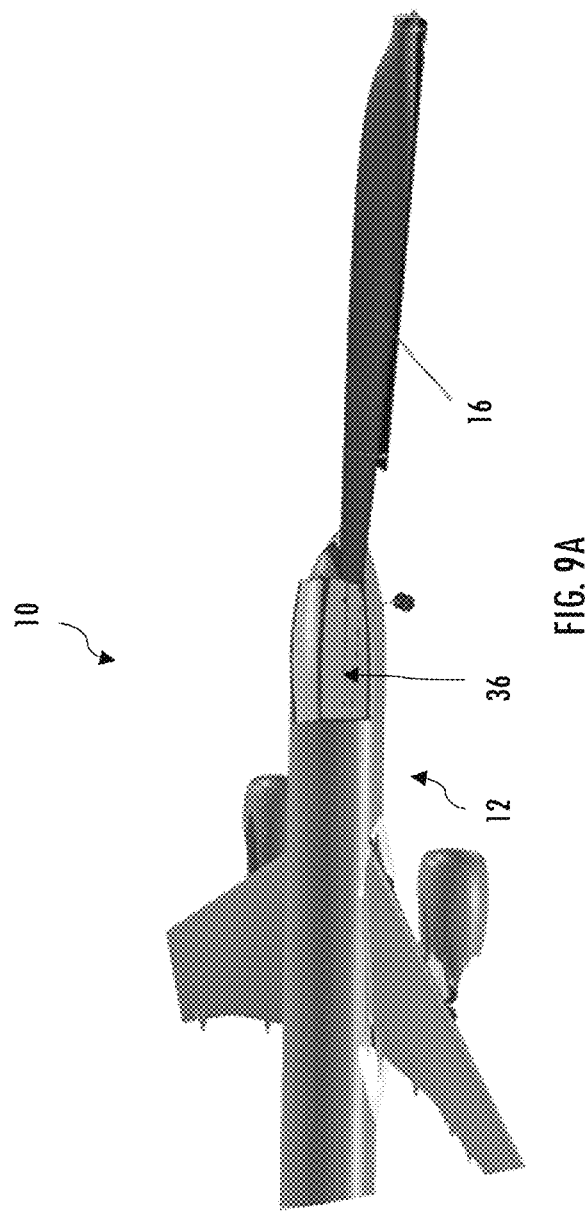

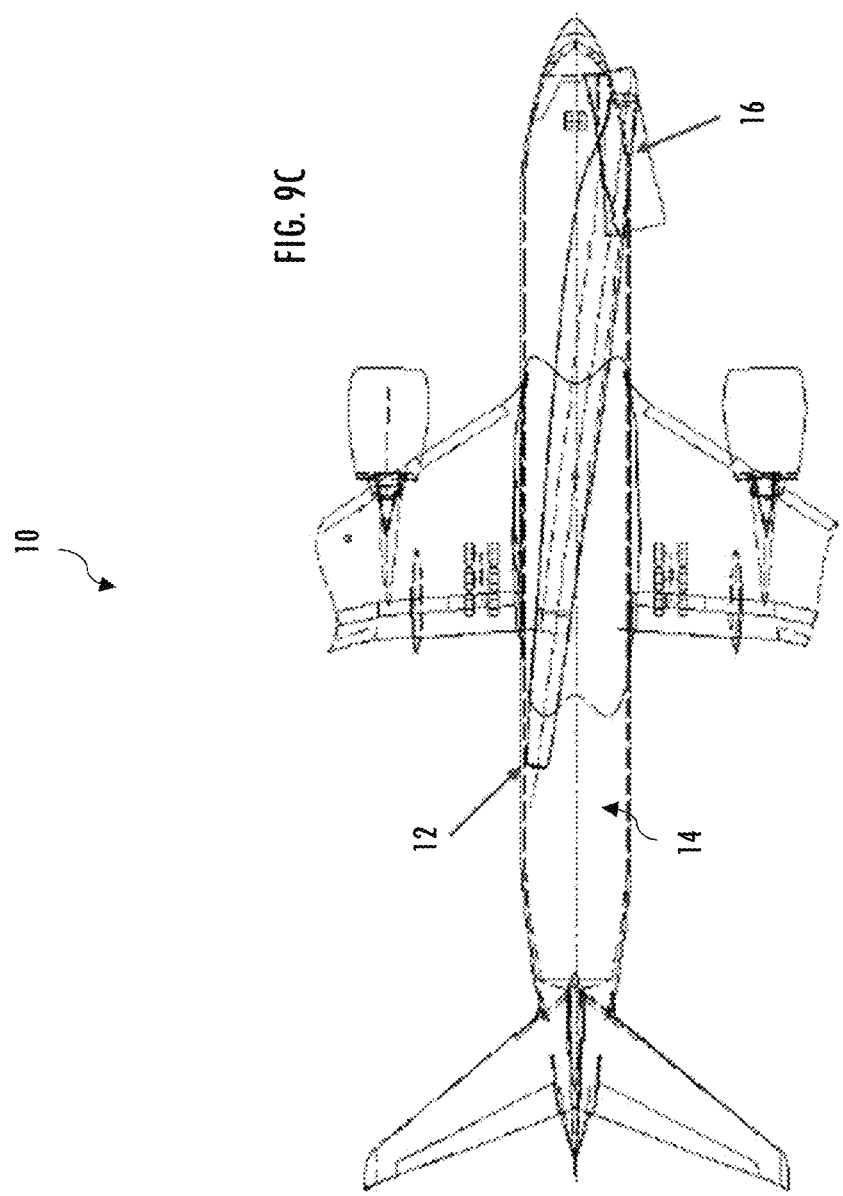

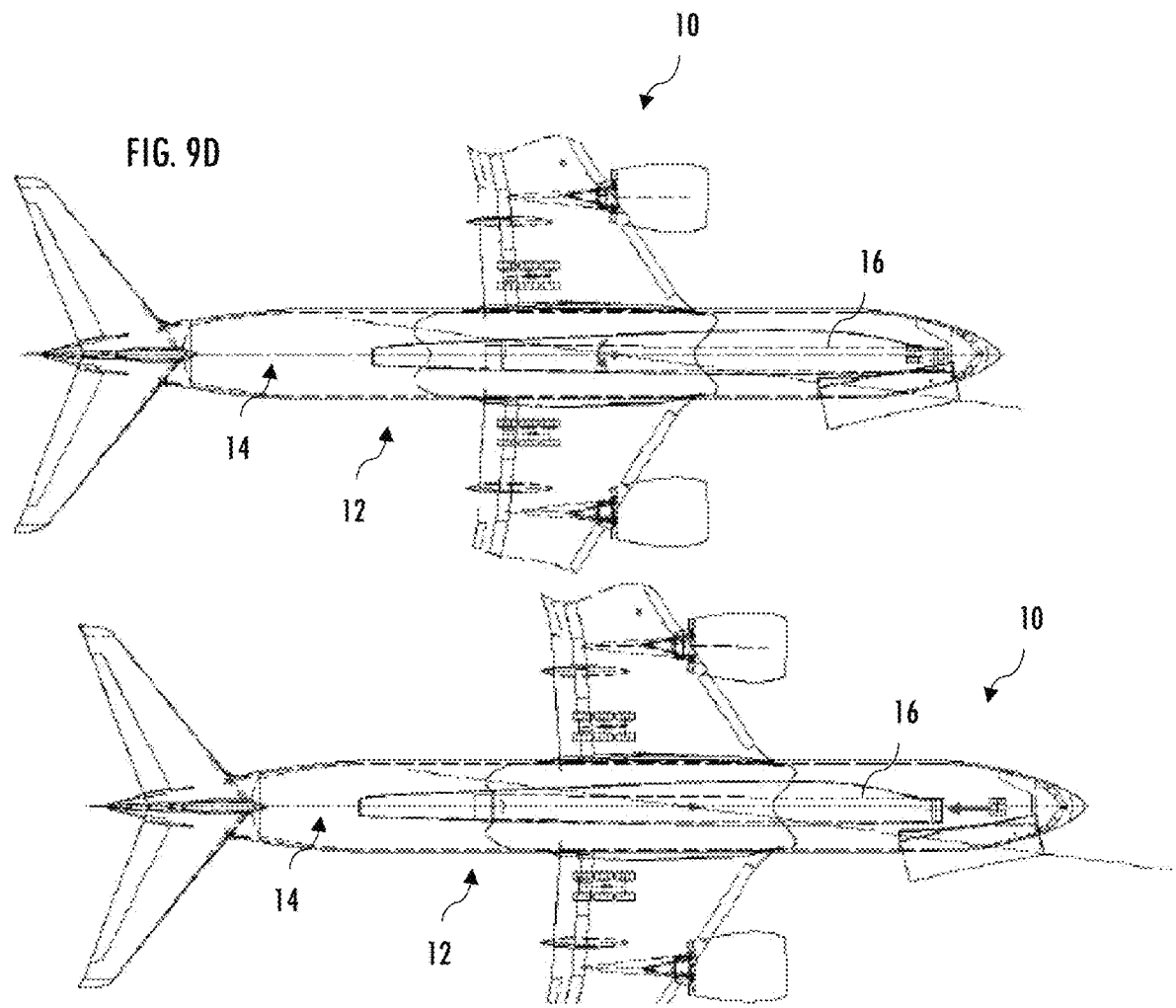

CARGO AIRCRAFT SYSTEM AND RELATED METHOD FOR LOADING ELONGATE CARGO THEREIN

BACKGROUND

Field of the Disclosure

The present disclosure relates to cargo aircraft and, more particularly, to a cargo aircraft bow side door for elongated cargo loading.

Description of Related Art

Current conventional commercial freighters or cargo aircraft are mainly derivatives of passenger airplanes where a main deck is re-configured to carry containers. These commercial freight airplanes are normally provided with large cargo door on the main deck capable of moving up to 12 foot (3.7 meters) long containers and pallets. However, commercial freight airplanes often need to transport oversized packages, such as long and relatively skinny cargo like well drilling equipment, wind turbine blades, and other high aspect ratio cargo. Current conventional airplane freighters cannot handle these high aspect ratio packages due to the length of the fuselage of the commercial freight airplanes being too short.

Thus, there exists a need for adapting current conventional commercial aircraft to be able to transport high aspect ratio cargo.

SUMMARY

The above and other needs are met by example implementations of the present disclosure which, in one aspect and without limitation, provides a cargo aircraft, comprising: a fuselage defining a longitudinally-extending cargo compartment and including: an elongate cylindrical portion having a substantially constant outer diameter, longitudinally-opposed forward and rearward ends, and laterally-opposed first and second sides, and a forward portion engaged with the forward end of the cylindrical portion, the forward portion having a cross-section tapering away from the cylindrical portion toward a lateral centerline, the fuselage defining a continuous cargo opening to the cargo compartment along the first side, the cargo opening having a first portion extending along the cylindrical portion to a rearward edge and a second portion extending along the forward portion to a forward edge, wherein an increased distance of the forward edge from the forward end of the cylindrical portion allows an elongate cargo item to be obliquely inserted lengthwise through the cargo opening from the forward edge at a decreased acute loading angle between the elongate cargo item and the lateral centerline.

In some example implementations of the aircraft of any preceding example implementation, or any combination thereof, an increased distance of the rearward edge from the forward end of the cylindrical portion allows the elongate cargo item to be obliquely inserted lengthwise through the cargo opening from the forward edge at a decreased acute loading angle between the elongate cargo item and the lateral centerline.

In some example implementations of the aircraft of any preceding example implementation, or any combination thereof, the elongate cargo item has opposed leading and trailing ends, and wherein second side of the cylindrical portion of the fuselage defines an auxiliary opening toward the rearward end of the cylindrical portion, the auxiliary opening being arranged so as to allow the leading end of the elongate cargo item to extend therethrough until the trailing end is disposed rearwardly of the forward edge of the cargo opening, such that the elongate cargo item can be pivoted about a medial portion thereof to be aligned substantially parallel with the lateral centerline within the cargo compartment.

In some example implementations of the aircraft of any preceding example implementation, or any combination thereof, the forward portion of the fuselage defines or includes a portion of a flight deck compartment disposed toward the second side of the fuselage, and wherein the second side of the fuselage defines a flight deck access opening in communication with the flight deck compartment.

In some example implementations of the aircraft of any preceding example implementation, or any combination thereof, a plane extending laterally through a longitudinal axis of the cylindrical portion of the fuselage defines a floor of the cargo compartment, and wherein the cargo opening defines a lower edge at an intersection between the plane and the first side of the fuselage.

In some example implementations of the aircraft of any preceding example implementation, or any combination thereof, the cargo opening extends upwardly from the lower edge and arcuately about the fuselage to an upper edge.

In some example implementations of the aircraft of any preceding example implementation, or any combination thereof, a distance between an intersection of the rearward and lower edges of the cargo opening and an intersection of the upper and forward edges of the cargo opening defines a maximum width of the cargo insertable into the cargo compartment through the cargo opening.

In some example implementations of the aircraft of any preceding example implementation, or any combination thereof, the aircraft comprises a cargo door arranged to provide access to the cargo compartment through the cargo opening, the cargo door being hinged about the upper edge of the cargo opening.

In some example implementations of the aircraft of any preceding example implementation, or any combination thereof, a lateral offset distance is defined between a first dimension between the lateral centerline and a first intersection of the rearward and lower edges of the door opening and a second dimension between the lateral centerline and a second intersection between the forward and lower edges of the door opening, the first and second dimensions being perpendicular to the lateral centerline; a door opening width is defined between the first intersection and the second intersection; a loading angle is defined between the elongate cargo item and the lateral centerline; and an effective door opening width normal to the loading angle is defined as a product of the lateral offset distance multiplied by the cosine of the loading angle and added to a product of the door opening width multiplied by the sine of the loading angle.

In some example implementations of the aircraft of any preceding example implementation, or any combination thereof, the cargo opening extends upwardly from the lower edge and arcuately about the fuselage about a radius from the lateral centerline, wherein the elongate cargo item defines a cargo width, a cargo depth, and a cargo length, and wherein the effective door opening width corresponding to a maximum width of the elongate cargo item receivable by the door opening is defined as a difference between a first product of the cargo length multiplied by a sine of the loading angle and a second product of the cargo depth multiplied by a cosine of the loading angle.

In some example implementations of the aircraft of any preceding example implementation, or any combination thereof, the loading angle has a maximum of 30 degrees for the elongate cargo item with the cargo length being at least 30 meters and the cargo width being at least 1 meter.

In some example implementations, a method of loading elongate cargo in an aircraft having a fuselage defining a longitudinally-extending cargo compartment and including an elongate cylindrical portion having a substantially constant outer diameter, longitudinally-opposed forward and rearward ends, and laterally-opposed first and second sides, and a forward portion engaged with the forward end of the cylindrical portion, the forward portion having a cross-section tapering away from the cylindrical portion toward a lateral centerline, comprises inserting a first elongate cargo item lengthwise into the cargo compartment obliquely through a continuous cargo opening defined by the fuselage along the first side, the cargo opening having a first portion extending along the cylindrical portion to a rearward edge and a second portion extending along the forward portion to a forward edge, the oblique lengthwise insertion of the first elongate cargo item through the cargo opening being initiated from the forward edge at an acute angle between the first elongate cargo item and the lateral centerline.

In some example implementations of the method of any preceding example implementation, or any combination thereof, inserting the first elongate cargo item lengthwise into the cargo compartment comprises obliquely- and lengthwise-inserting the first elongate cargo item through the cargo opening from the forward edge at a decreased acute angle between the first elongate cargo item and the lateral centerline in response to an increased distance of the forward edge of the cargo opening from the forward end of the cylindrical portion.

In some example implementations of the method of any preceding example implementation, or any combination thereof, inserting the first elongate cargo item lengthwise into the cargo compartment comprises obliquely- and lengthwise-inserting the first elongate cargo item through the cargo opening from the forward edge at a decreased acute angle between the first elongate cargo item and the lateral centerline in response to an increased distance of the rearward edge from the forward end of the cylindrical portion.

In some example implementations of the method of any preceding example implementation, or any combination thereof, the first elongate cargo item has opposed leading and trailing ends, and wherein inserting the first elongate cargo item lengthwise into the cargo compartment comprises: obliquely- and lengthwise-inserting the first elongate cargo item through the cargo opening from the forward edge and at the acute angle between the first elongate cargo item and the lateral centerline until the trailing end is disposed rearwardly of the forward edge of the cargo opening; and pivoting the leading and trailing edges of the first elongate cargo item about a medial portion of the first elongate cargo item to align the first elongate cargo item substantially parallel with the lateral centerline within the cargo compartment.

In some example implementations of the method of any preceding example implementation, or any combination thereof, a second elongate cargo item has opposed leading and trailing ends, and wherein the method comprises: translating the first elongate cargo item toward the rearward end and toward the first side of the cylindrical portion; inserting the second elongate cargo item lengthwise into the cargo compartment by obliquely- and lengthwise-inserting the second elongate cargo item through the cargo opening from the forward edge and at the acute angle between the second elongate cargo item and the lateral centerline until the trailing end is disposed rearwardly of the forward edge of the cargo opening; pivoting the leading and trailing edges of the second elongate cargo item about a medial portion of the second elongate cargo item to align the second elongate cargo item substantially parallel with the lateral centerline within the cargo compartment; and translating the first and second elongate cargo items within the cylindrical portion to align the first and second elongate cargo items within the cargo compartment.

In some example implementations of the method of any preceding example implementation, or any combination thereof, the first elongate cargo item has opposed leading and trailing ends, wherein second side of the cylindrical portion of the fuselage defines an auxiliary opening toward the rearward end of the cylindrical portion, and wherein inserting the first elongate cargo item lengthwise into the cargo compartment comprises: obliquely- and lengthwise-inserting the first elongate cargo item through the cargo opening from the forward edge and at the acute angle between the first elongate cargo item and the lateral centerline so as to allow the leading end of the first elongate cargo item to extend through the auxiliary opening until the trailing end is disposed rearwardly of the forward edge of the cargo opening; and pivoting the leading and trailing edges of the first elongate cargo item about a medial portion of the first elongate cargo item to align the first elongate cargo item substantially parallel with the lateral centerline within the cargo compartment.

In some example implementations of the method of any preceding example implementation, or any combination thereof, a second elongate cargo item has opposed leading and trailing ends, and wherein the method comprises: translating the first elongate cargo item toward the rearward end and toward the first side of the cylindrical portion; inserting the second elongate cargo item lengthwise into the cargo compartment by obliquely- and lengthwise-inserting the second elongate cargo item through the cargo opening from the forward edge and at the acute angle between the second elongate cargo item and the lateral centerline so as to allow the leading end of the second elongate cargo item to extend through the auxiliary opening until the trailing end is disposed rearwardly of the forward edge of the cargo opening; pivoting the leading and trailing edges of the second elongate cargo item about a medial portion of the second elongate cargo item to align the second elongate cargo item substantially parallel with the lateral centerline within the cargo compartment; and translating the first and second elongate cargo items within the cylindrical portion to align the first and second elongate cargo items within the cargo compartment.

In some example implementations of the method of any preceding example implementation, or any combination thereof, a plane extending laterally through a longitudinal axis of the cylindrical portion of the fuselage defines a floor of the cargo compartment, wherein the cargo opening defines a lower edge at an intersection between the plane and the first side of the fuselage, wherein the cargo opening extends upwardly from the lower edge and arcuately about the fuselage to an upper edge, and wherein inserting the first elongate cargo item lengthwise into the cargo compartment obliquely through the cargo opening comprises obliquely- and lengthwise-inserting the first elongate cargo item, having a maximum width defined by a distance between an intersection of the rearward and lower edges of the cargo opening and an intersection of the upper and forward edges of the cargo opening, into the cargo compartment through the cargo opening.

In some example implementations of the method of any preceding example implementation, or any combination thereof, accessing the cargo compartment through the cargo opening, by way of a cargo door hinged about the upper edge of the cargo opening.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

FIG. 1 schematically illustrates a cargo aircraft according to example implementations of this disclosure.

Figure 2A:
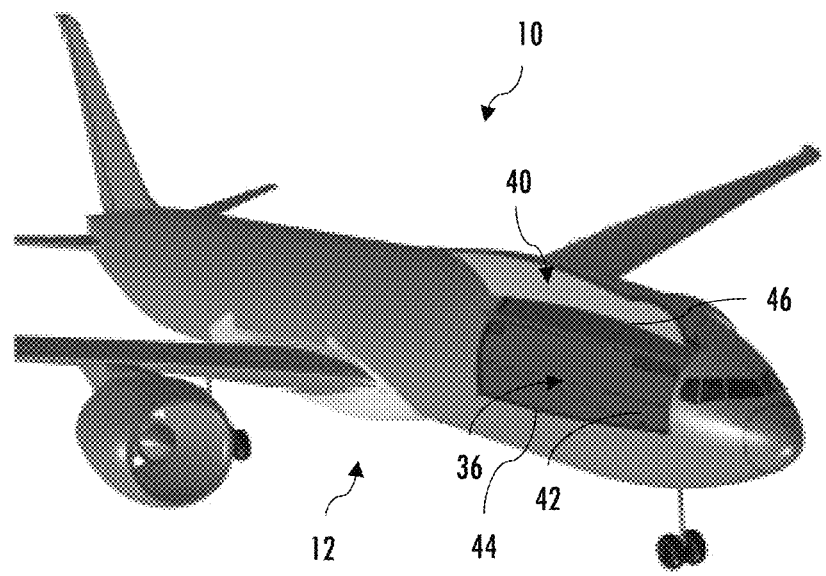
Figure 2B:
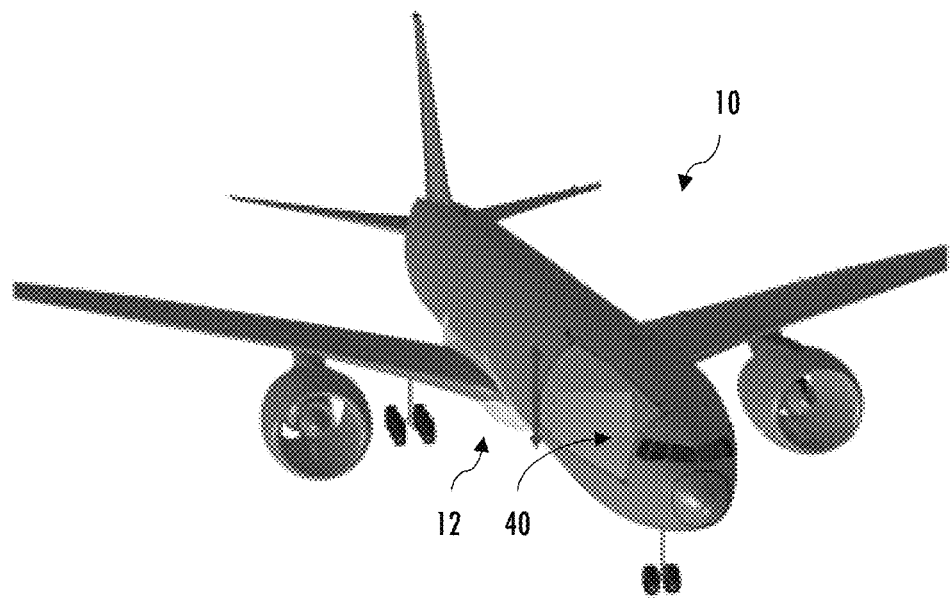

FIGS. 2A and 2B schematically illustrate an arrangement of a cargo opening with a cargo door on a fuselage of a cargo aircraft according to example implementations of this disclosure.

Figure 3:
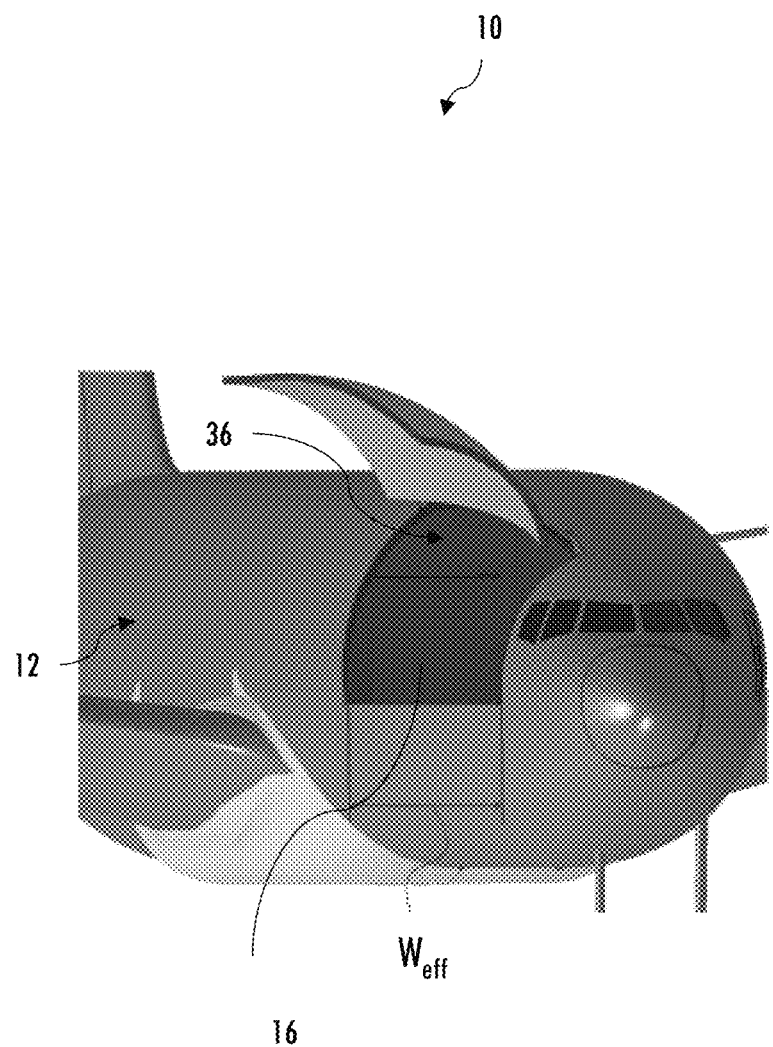

FIG. 3 schematically illustrates an effective door opening width for a cargo opening of a cargo aircraft according to example implementations of this disclosure.

Figure 4:
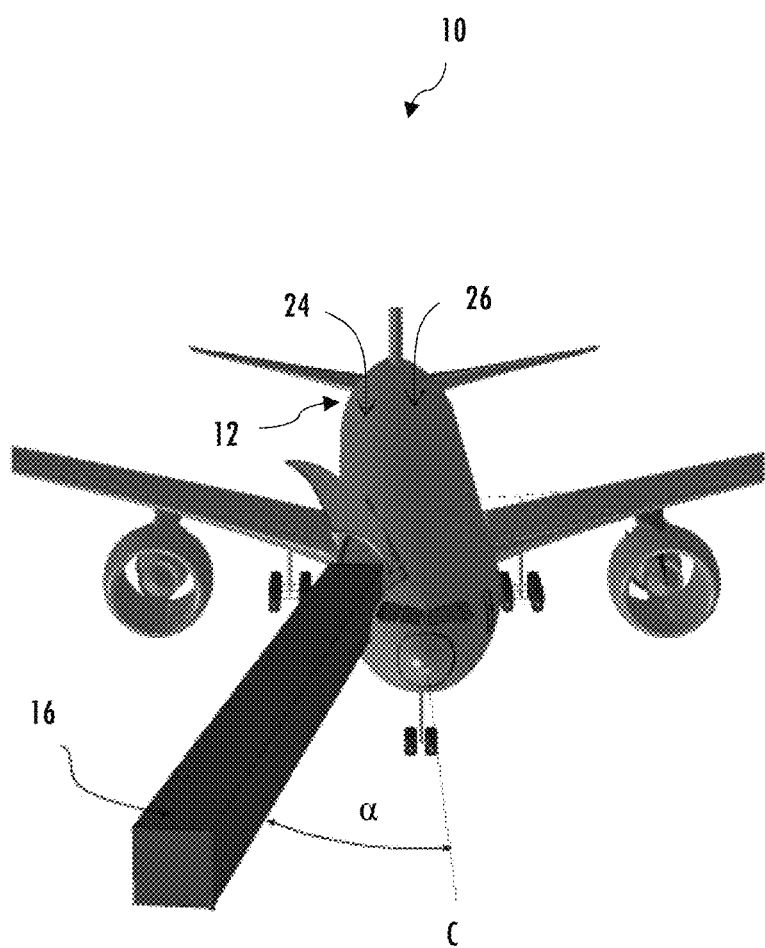

FIG. 4 schematically illustrates a loading angle for a cargo opening of a cargo aircraft according to example implementations of this disclosure.

Figure 5:
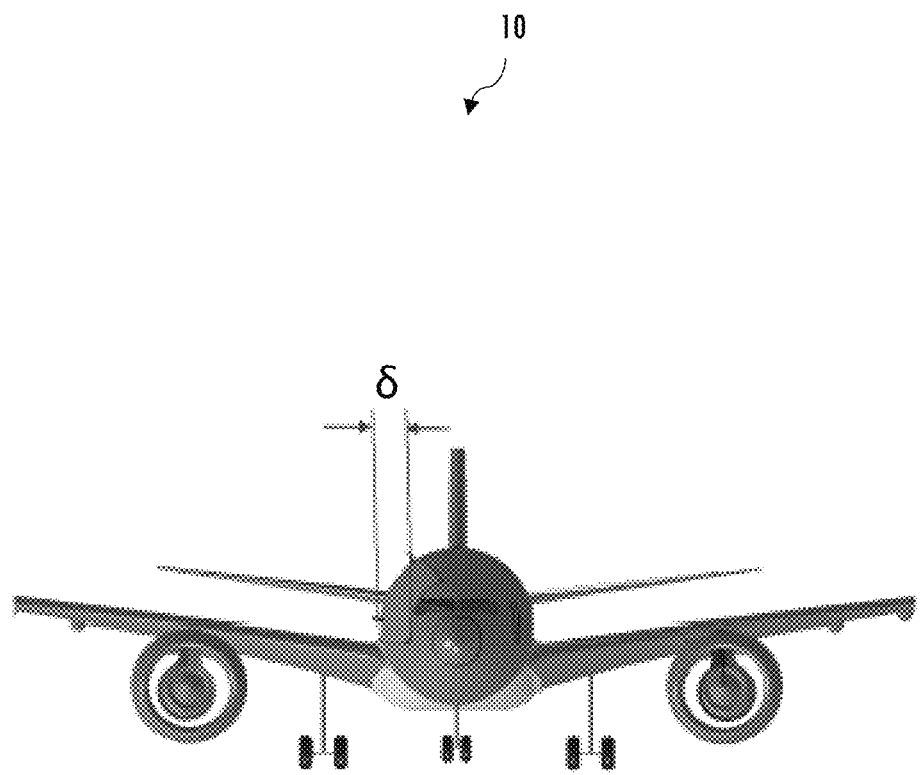

FIG. 5 schematically illustrates a lateral offset distance for a cargo opening of a cargo aircraft according to example implementations of this disclosure.

FIG. 6 is a method flow diagram of a method of loading elongate cargo in an aircraft according to example implementations of this disclosure.

Figure 7A:
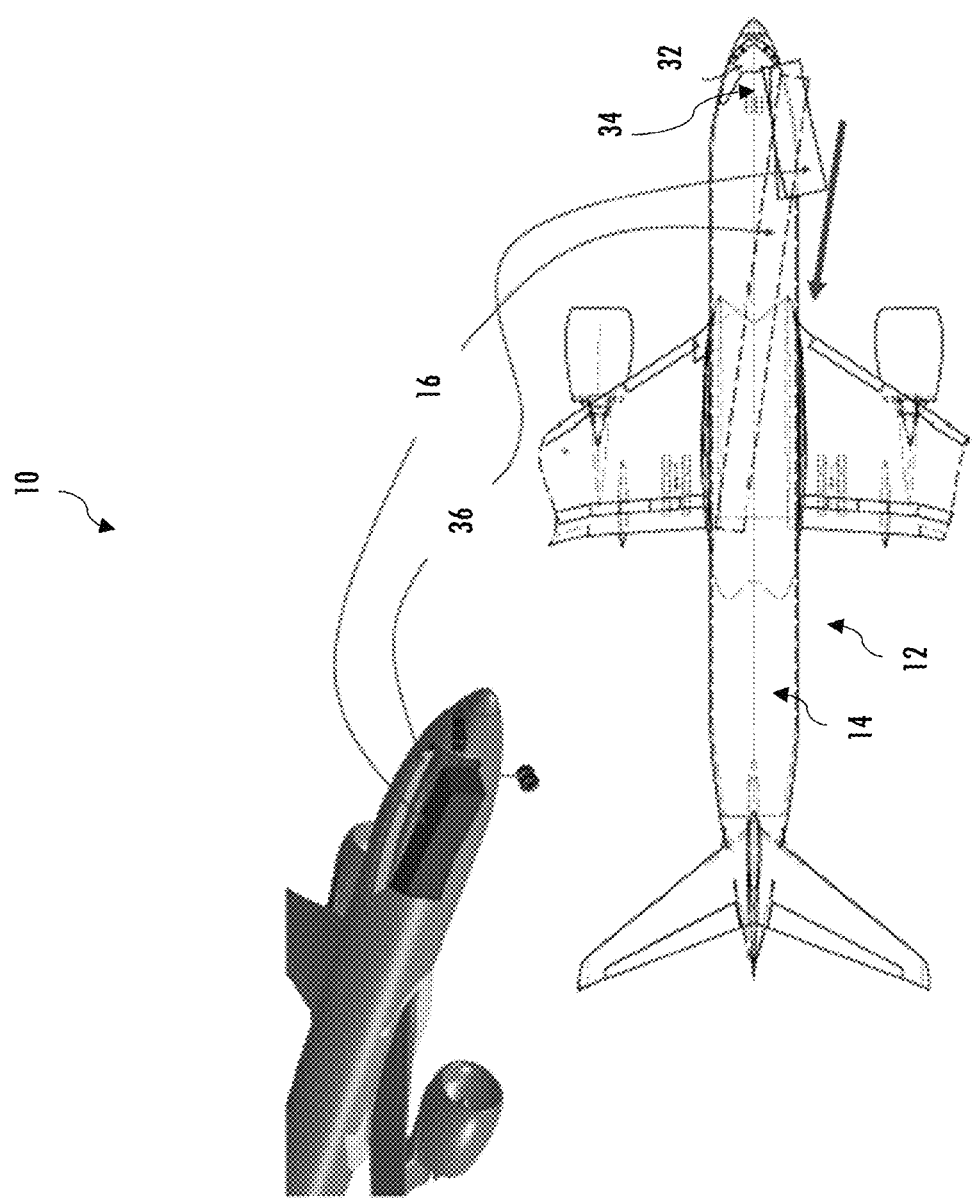
Figures 7B, 7C:
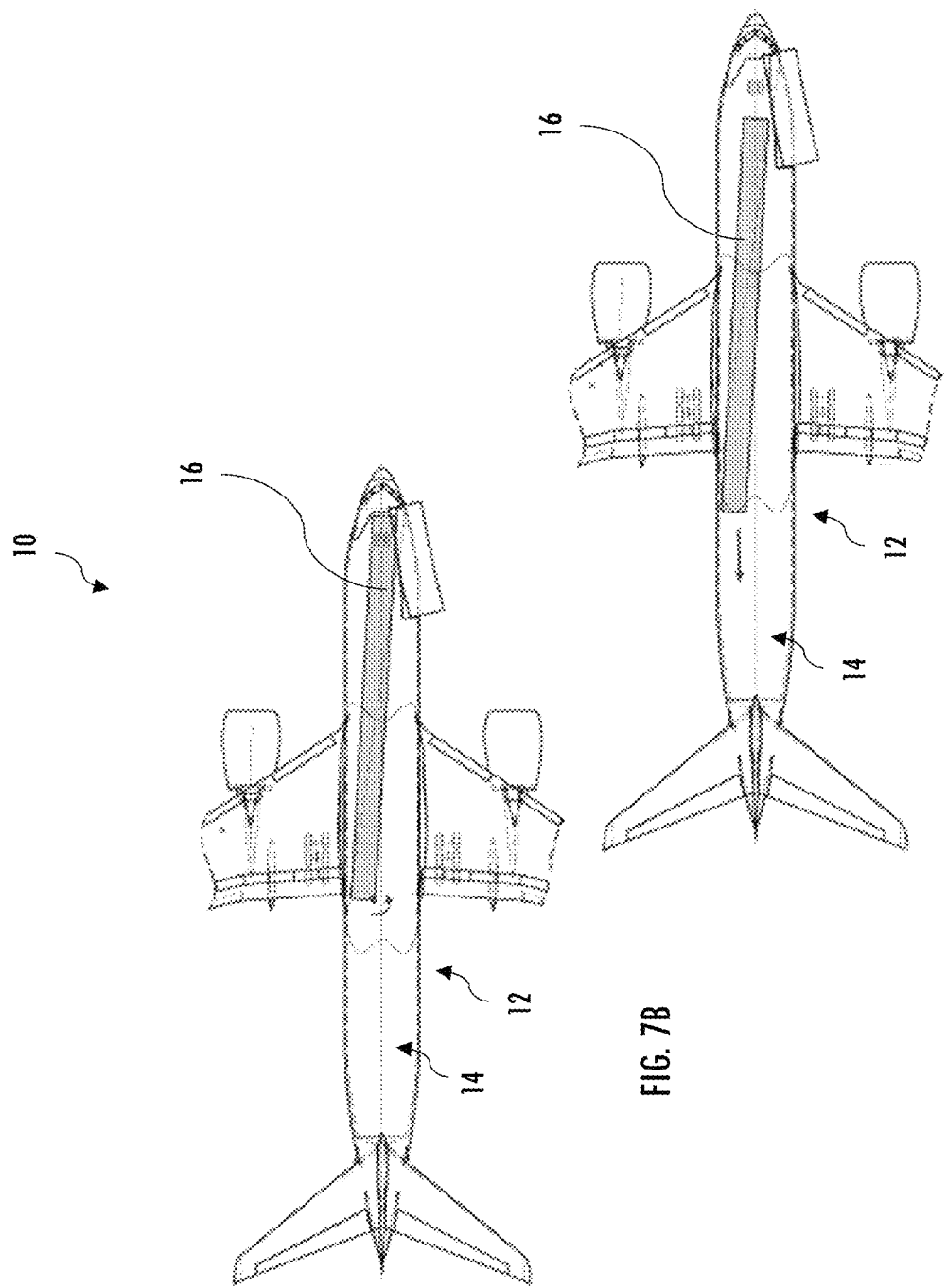

FIGS. 7A-7C schematically illustrate a method of loading an example elongate cargo item in a cargo aircraft according to example implementations of this disclosure.

Figure 8C:
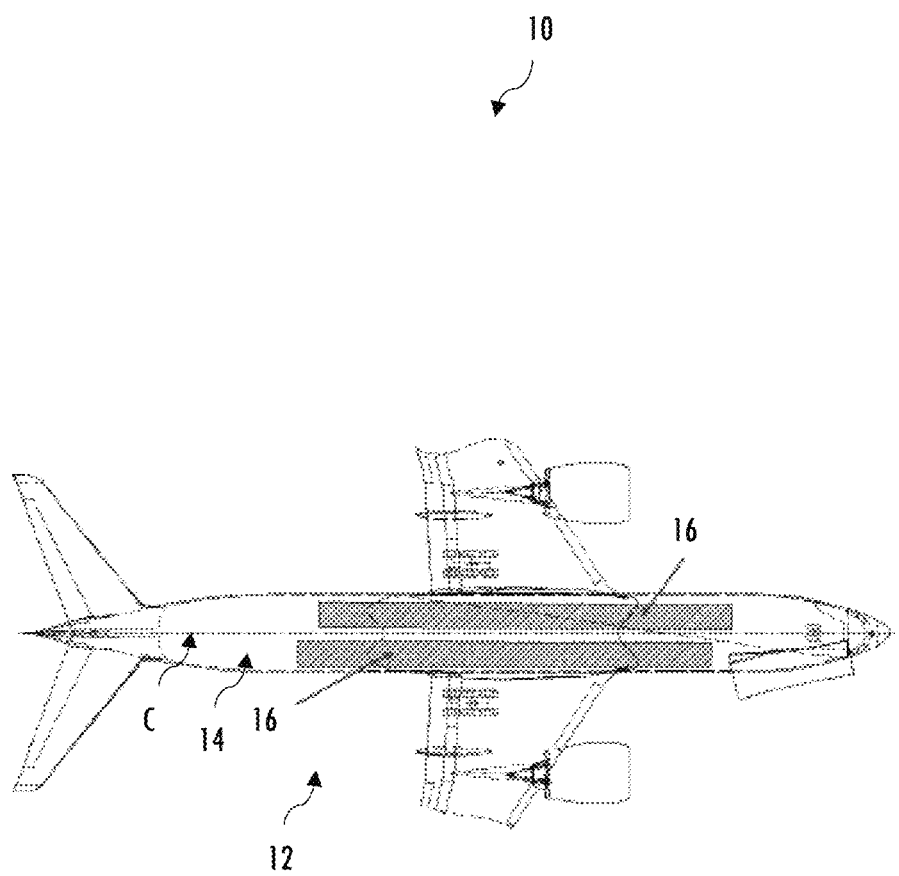

FIGS. 8A-8C schematically illustrate a method of loading another example elongate cargo item in a cargo aircraft according to example implementations of this disclosure.

FIGS. 9A-9E schematically illustrate a method of loading a further example elongate cargo item in a cargo aircraft according to example implementations of this disclosure.

Figure 10:
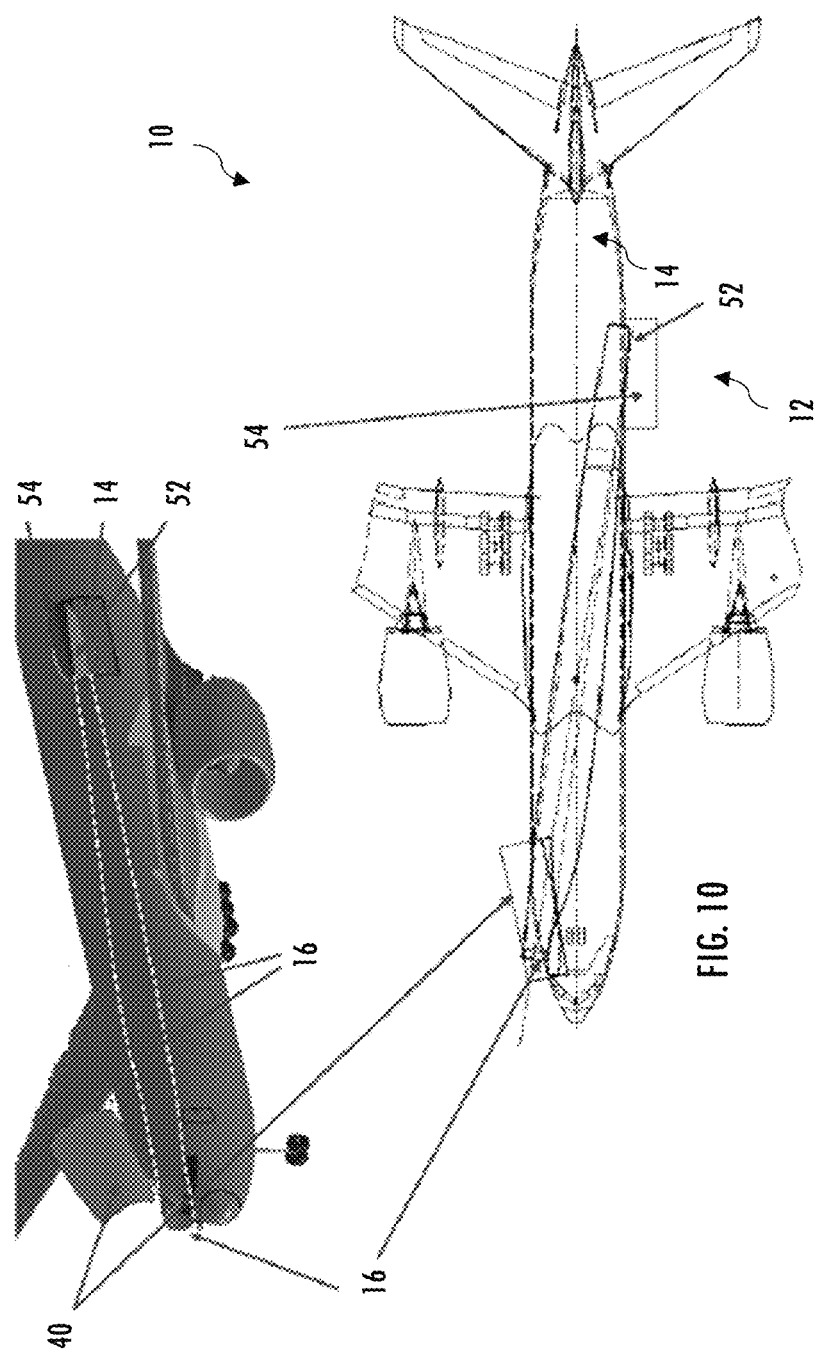

FIG. 10 schematically illustrates a method of loading still another example elongate cargo item in a cargo aircraft according to example implementations of this disclosure.

DETAILED DESCRIPTION OF THE DISCLOSURE

The present disclosure now will be described more fully hereinafter with reference to the accompanying drawings, in which some, but not all aspects of the disclosure are shown. Indeed, the disclosure may be embodied in many different forms and should not be construed as limited to the aspects set forth herein; rather, these aspects are provided so that this disclosure will satisfy applicable legal requirements. Like numbers refer to like elements throughout.

FIG. 1 schematically illustrates an aircraft 10, for example. In some aspects, the aircraft 10 is a conventional commercial aircraft that has been adapted for carrying freight, or is a freighter aircraft. As used herein, "cargo aircraft" generally refers to any type of aircraft capable of aerially transporting cargo. Generally, in one aspect, the aircraft 10 includes a fuselage 12 defining a longitudinally-extending cargo compartment 14 located on a main deck, which is generally considered the deck on which the major portion of the payload is carried. The longitudinally-extending cargo compartment 14 is configured to receive traditional Unit Loader Devices (ULDs), as well as elongate cargo items 16 each defining a cargo width ($w_{cargo}$), a cargo height or depth ($d_{cargo}$), and a cargo length ($l_{cargo}$). As used herein, an "elongate cargo item", a "cargo package", a "cargo item", a "high-aspect ratio package", and all similar terms, is an item where a longitudinal dimension (cargo length $l_{cargo}$) is greater than (and often significantly greater than) the cargo lateral dimension width $w_{cargo}$ and/or a cargo depth $d_{cargo}$. Elongate cargo items 16 include, but are not limited to, packages with ratios of 10 or more like (but not limited to) well drilling equipment packages, wind turbine blades, turbomachinery rotors, airplane wing and empennage pieces etc.

The fuselage 12 includes an elongate cylindrical portion 18. In some example implementations, the cylindrical portion 18 has a substantially constant outer diameter and longitudinally-opposed forward and rearward ends 20, 22, and laterally-opposed first and second sides 24, 26 (FIG. 4). The cylindrical portion 18 also has an outer diameter that is non-constant. The fuselage 12 also includes a forward portion 28 engaged with the forward end 20 of the cylindrical portion 18. The forward portion 28 has a cross-section tapering away from the cylindrical portion 18 toward a lateral centerline C (FIG. 4). In some example implementations, the forward portion 28 of the fuselage 12 defines or includes a portion of a flight deck compartment 32 (FIG. 7A) disposed toward the second side 26 of the fuselage 12. The second side 26 of the fuselage 12 defines a flight deck access opening 34 (FIG. 7A) in communication with the flight deck compartment 32. The flight deck compartment 32 and the longitudinally-extending cargo compartment 14 is a substantially continuous space via the flight deck access opening 34 or there is a barrier (e.g., a door) between the flight deck compartment 32 and the flight deck access opening 34 and the longitudinally-extending cargo compartment 14.

In some example implementations, the longitudinally-extending cargo compartment 14, the cylindrical portion 18 and/or the forward portion 28 of the fuselage 12 including the flight deck compartment 32 have the design, shape and/or interior and exterior dimensions of a conventional commercial freighter aircraft, such as, the BOEING® 747-8F, BOEING® 777F, BOEING® 767-300F, BOEING® 767-300BCF, and the BOEING® 737-800BCF. Otherwise, the longitudinally-extending cargo compartment 14, the cylindrical portion 18 and/or the forward portion 28 of the fuselage 12 including the flight deck compartment 32 have the design, shape and/or interior and exterior dimensions of other types of aircraft.

The fuselage 12 defines a continuous cargo opening 36 to the cargo compartment 14 along the first side 24. The cargo opening 36 is defined on the first side 24 or the second side 26 of the elongate cylindrical portion 18. The cargo opening 36 has a first portion extending along the cylindrical portion 18 of the fuselage 12 to a rearward edge 38 and a second portion extending along the forward portion 28 to a forward edge 30. The two portions are continuous relative to one another. As FIG. 1 illustrates, the cargo opening 36 is located in a very forward fuselage position right aft from the flight deck 32.

Due to the arrangement of the cargo opening 36 on the fuselage 12, elongate cargo items 16 are loaded as contemplated herein, as compared with conventional cargo aircraft main deck configurations which are not able to receive elongate cargo items 16. More particularly, by adapting the flight deck compartment 32 by removing a floor area directly behind a seat for a co-pilot a length of the flight deck compartment 32 are reduced so as to increase a length of the cargo compartment 14. Where there is a reduced crew (i.e., a single pilot), the flight deck compartment 32 is even further longitudinally reduced so long as the pilot's polar angle through the windshield of the cockpit meets necessary standards. By doing so, a length of the cargo compartment 14 is increased, while the flight deck compartment 32 is decreased, which allows for a larger cargo opening 36 and thereby storage of larger cargo.

For example, and as a result of adapting the main deck to increase a length of the cargo compartment 14, an increased distance $\Delta x_1$ of the forward edge 30 from the forward end 20 of the cylindrical portion 18 allows the elongate cargo item to be obliquely inserted lengthwise through the cargo opening 36 from the forward edge 30 at a decreased acute loading angle as defined between the elongate cargo item 16 and the lateral centerline C. In some example implementations, the acute loading angle, loading angle, or angle of loading ($\alpha$) is about 8.5 degrees, but is also, in some examples, anywhere from between about 0 degrees and about 35 degrees. Furthermore, an increased distance $\Delta x_2$ of the rearward edge 38 from the forward end 20 of the cylindrical portion 18 allows the elongate cargo item 16 to be obliquely inserted lengthwise through the cargo opening 36 from the forward edge 30 at a decreased acute loading angle $\alpha$ between the elongate cargo item and the lateral centerline C.

FIGS. 2A and 2B illustrate, in one example implementation, an arrangement of the cargo opening 36 with a cargo door 40 on the fuselage 12. A plane extending laterally through a longitudinal axis or waterline WL (FIG. 1) of the cylindrical portion 18 of the fuselage 12 defines a floor 42 of the cargo compartment 14, such that the cargo opening 36 defines a lower edge 44 at an intersection between the plane and the first side 24 of the fuselage 12. Accordingly, the lower edge 44 or threshold of the cargo opening 36 is formed on the waterline WL of the main deck, and the cargo opening 36 extends upwardly from the lower edge 44 and arcuately about the fuselage 12 to an upper edge 46 and about a radius from the lateral centerline C. In other words, the cargo opening 36 is curved to match the curve of the fuselage 12. The cargo opening 36 is also arranged so that it overlaps the cylindrical portion 18 and the forward portion 28 of the fuselage 12. For example, the rearward edge 38 of the cargo opening 36 is arranged between the rearward end 22 and the forward end 20 of the cylindrical portion 18, while the forward edge 30 of the cargo opening 36 is arranged between the forward end 20 of the cylindrical portion 18 and a nose end of the forward portion 28.

The cargo door 40 is arranged to provide access to the cargo compartment 14 through the cargo opening 36. The cargo door 40 is hinged about an upper edge 46 of the cargo opening 36, and opens upwards about the hinge, is hinged about the lower edge 44 of the cargo opening 36 and opens downwards about the hinge, slides toward the rearward end 22 and/or the forward end 20 of the elongate cylindrical portion 18, or the like. Other manners of attaching the cargo door 40 to the cargo opening 36 are contemplated herein.

In some example implementations, a lateral offset distance $\delta$ is defined between a first dimension between the lateral centerline C and a first intersection of the rearward and lower edges 44, 46 of the cargo opening 36 and a second dimension between the lateral centerline C and a second intersection between the forward and lower edges 44, 46 of the cargo opening 36. The first and second dimensions are perpendicular to the lateral centerline C. A door opening width ($W_d$) is limited by the fuselage strength requirements and normally cannot exceed a doubled fuselage diameter.

Other distances are also contemplated based on the dimensions of the aircraft 10. For example, an effective door opening width ($W_{eff}$) (FIG. 3) is a door opening width that is projected on a plane that is normal to the direction of loading, i.e., normal to the loading angle $\alpha$. The effective door opening width $W_{eff}$ is defined as the product of the lateral offset distance $\delta$ (FIG. 5) multiplied by the cosine of the loading angle $\alpha$ and added to a product of the door opening width $W_d$ multiplied by the sine of the loading angle $\alpha$ as seen in FIG. 3, and which can be determined from the following equation, EQUATION 1.

$$W_{eff} = W_d * \sin(\alpha) + \delta * \cos(\alpha),$$ EQUATION 1:

where a is the loading angle as illustrated in FIG. 4, $\delta$ is the lateral offset distance as defined in FIG. 5, and $W_d$ is the door opening width. Notably, it is advantageous for the lateral offset distance $\delta$ to be greater than zero (0) by positioning the cargo opening 36 closer to the bow. In this manner, then the cargo opening 36 is smaller than in the cylindrical portion 18, as compared to traditional fuselages where the lateral offset distance $\delta$ is zero (0). As the lateral offset distance $\delta$ increases, elongate cargo items with longer than traditional ULD lengths $l_{cargo}$ are receivable into the fuselage 12 through the cargo opening 36 with door opening width $W_d$.

The effective door opening $W_{eff}$ found from EQUATION 1 can also be used to determine a maximum width and length of the cargo that is inserted through the cargo compartment 14 through the cargo opening 36. For example, the effective door opening width $W_{eff}$ corresponding to a maximum width of the elongate cargo item $w_{cargo\_max}$ receivable by the door opening is defined as a difference between a first product of the cargo length ($l_{cargo}$) multiplied by a sine of the loading angle $\alpha$ and a second product of the cargo depth ($d_{cargo}$) multiplied by a cosine of the loading angle $\alpha$. Thus, in one example implementation, the loading angle $\alpha$ has a maximum of 30 degrees for the elongate cargo item with the cargo length being at least 30 meters and the cargo width being at least 1 meter.

Accordingly, the cargo opening 36 as described herein is capable of accommodating elongate cargo items 16, as well as cargo items 16 that are not elongate. Where a cargo item 16 has a length ($l_{cargo}$) that is less than the width of the cargo opening $W_d$, then the cargo item 16 is translated in and out of the door in a lateral direction (i.e., movement relative to the first and second sides 24, 26 of the elongate cylindrical portion 18). Where a cargo item has a length ($l_{cargo}$) that is greater than the width of the cargo opening $W_d$, then the cargo item 16 is loaded into and out of the cargo opening 36 along the acute loading angle between the elongate cargo item 16 and the lateral centerline C (angle of loading α).

After determining that a cargo item 16 is loadable into the cargo aircraft 10 (i.e., the dimensions of the cargo item 16 allow it to be loaded into a cargo opening 36 with a defined width $W_d$, then a loading system and/or method is utilized to position the cargo item 16 relative to the cargo opening 36. A loading system is a cargo roller system, a dolly with wheels, etc. Where a cargo roller system is used, the system is multidirectional to allow for angular loading. Where a dolly with wheels is used, steering capabilities is used to aid in loading the cargo item.

FIG. 6 illustrates a process flow diagram of an example method of loading elongate cargo in an aircraft 10, generally designated as 48. With regard to this method, the aircraft 10 has a fuselage 12 defining a longitudinally-extending cargo compartment 14 and including an elongate cylindrical portion 18 having a substantially constant outer diameter, longitudinally-opposed forward and rearward ends 20, 22, and laterally-opposed first and second sides 24, 26, and a forward portion 28 engaged with the forward end 20 of the cylindrical portion 18, the forward portion 28 having a cross-section tapering away from the cylindrical portion 18 toward a lateral centerline C. In a first step, 50, the method comprises inserting a first elongate cargo item lengthwise into the cargo compartment 14 obliquely through a continuous cargo opening 36 defined by the fuselage 12 along the first side 24, the cargo opening 36 having a first portion extending along the cylindrical portion 18 to a rearward edge 38 and a second portion extending along the forward portion 28 to a forward edge 30, the oblique lengthwise insertion of the first elongate cargo item through the cargo opening 36 being initiated from the forward edge 30 at an acute angle between the first elongate cargo item and the lateral centerline C.

Accordingly, the following examples illustrate several implementations of loading systems and loading methods for loading elongate cargo items 16 of different sizes and/or shapes through a cargo opening 36 and into a cargo aircraft 10. However, these systems and methods are merely examples and in no way limit the systems and methods that could be used to load and unload elongate cargo items 16 in the aircraft 10 of this disclosure.

Example 1: Oil Well Drill Pack

When loading a first elongate cargo item 16, inserting the first elongate cargo item 16 lengthwise into the cargo compartment 14 comprises obliquely- and lengthwise-inserting the first elongate cargo item 16 through the cargo opening 36 from the forward edge 30 at a decreased acute angle between the first elongate cargo item 16 and the lateral centerline C in response to an increased distance of the rearward edge 38 and/or forward edge 30 of the cargo opening 36 from the forward end 20 of the cylindrical portion 18. More specifically, inserting the first elongate cargo item 16 comprises obliquely- and lengthwise-inserting the first elongate cargo item 16 through the cargo opening 36 from the forward edge 30 and at the acute angle between the first elongate cargo item 16 and the lateral centerline C until the trailing end is disposed rearwardly of the forward edge 30 of the cargo opening 36; and pivoting the leading and trailing edges of the first elongate cargo item about a medial portion of the first elongate cargo item to align the first elongate cargo item substantially parallel with the lateral centerline C within the cargo compartment 14.

In one example implementation, such loading of a first elongate cargo item 16 is shown in EXAMPLE 1 and FIGS. 7A-7C, where an oil well drill is packaged in box that is about 104.5 feet in length and 3 feet in width and 3 feet in height, and can be loaded into a cargo opening 36 with a width $W_d$ of about 3 feet at an angle of loading α of about 8.5 degrees.

Example 2: Two Oil Well Drill Packs

Using the loading method described in EXAMPLE 1 for loading the first elongate cargo item 16 in the aircraft 10, a second elongate cargo item 16 is loaded, as well. The second elongate cargo item 16 has opposed leading and trailing ends. The method for loading the second elongate cargo item 16 comprises translating the first elongate cargo item 16 toward the rearward end 22 and toward the first side 24 of the cylindrical portion 18; inserting the second elongate cargo item 16 lengthwise into the cargo compartment 14 by obliquely- and lengthwise-inserting the second elongate cargo item 16 through the cargo opening 36 from the forward edge 30 and at the acute angle between the second elongate cargo item 16 and the lateral centerline C until the trailing end is disposed rearwardly of the forward edge 30 of the cargo opening 36; pivoting the leading and trailing edges of the second elongate cargo item 16 about a medial portion of the second elongate cargo item 16 to align the second elongate cargo item 16 substantially parallel with the lateral centerline C within the cargo compartment 14; and translating the first and second elongate cargo items 16 within the cylindrical portion 18 to align the first and second elongate cargo items 16 within the cargo compartment 14.

In one example implementation, such loading of first and second elongate cargo items 16 is shown in EXAMPLE 2 and FIGS. 8A-8C, where two oil well drills are packaged in individual boxes that are about 104.5 feet in length and 3 feet in width and 3 feet in height, and can be loaded into a cargo opening 36 with a width $W_d$ of about 3 feet at an angle of loading α of about 8.5 degrees.

Example 3: Wind Turbine Blade

Figure 9B:
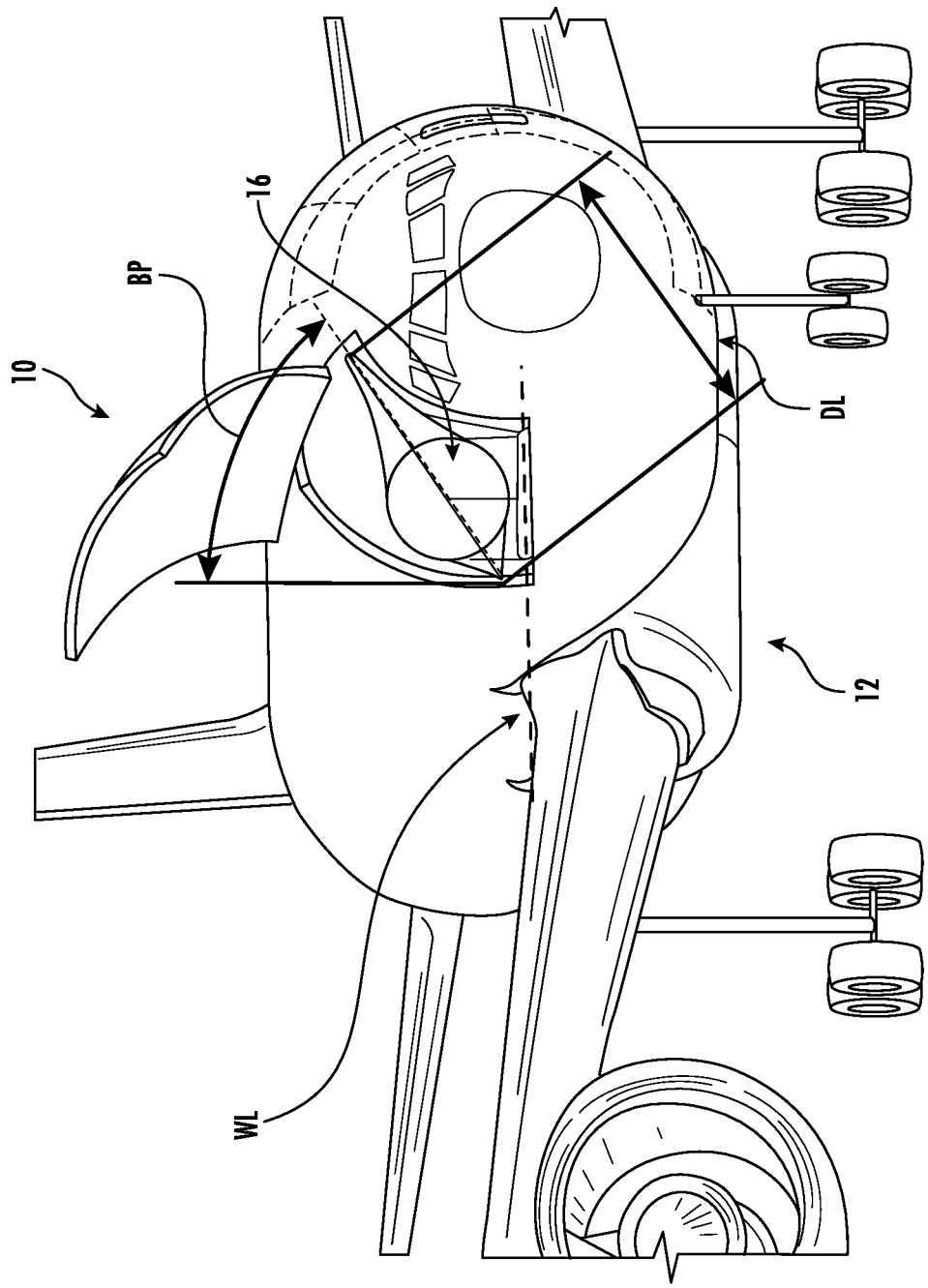

Wind turbine blades generally do not have a consistent cross-sectional area, like the oil well drilling packages in EXAMPLES 1 and 2. Indeed, the largest blade size possible to load through the cargo opening 36 without penetration through the second side 26 of the elongate cylindrical portion 18 is limited by a length of the diagonal line DL connecting corners of the door clear opening projected on plane that is normal to direction of platform. In one example implementation, such loading of an elongate cargo item with a non-constant cross-sectional area is shown in EXAMPLE 3 and FIGS. 9A-9E. As illustrated in FIG. 9A, a majority of wind turbine blades have a very close form factor length/maximum chord of about 11. With this length, the smallest angle of loading α is about seven degrees. FIG. 9B illustrates the position of the blade within the cargo opening 36. In particular, the blade is rotated about its longitudinal axis until a chord line at the widest portion of the blade $W_{cargo\_max}$ is oriented at the intersection of the rearward and lower edges 38, 44 of the cargo opening 36 and the intersection of the upper and forward edges 46, 30 of the cargo opening 36. The blade pitch (BP) is defined as an angle between the widest portion of the blade $W_{cargo\_max}$ and the intersection of the rearward and lower edges 38, 44 of the cargo opening 36. In FIG. 9C, the blade is translated through the cargo opening 36 along the angle of loading α. Clearance between the leading edge of the blade and the second side 26 of the fuselage 12 is present, so that the blade is rotated into a transportation position, where the blade will remain during transport thereof. In FIG. 9D, a loading system is used to rotate the blade clockwise along its longitudinal axis, and in FIG. 9E, the blade is translated toward the rearward end 22 of the cylindrical portion 18 into the transportation position.

Notably, where there is more than one wind turbine blade, the multiple blades are packaged so that there is a smaller footprint. For example, the blades are similarly loaded by packing them flat with each other, such that a leading edge of a first blade is arranged adjacent to a trailing edge of a second blade, and a trailing edge of the first blade is arranged adjacent to a leading edge of the second blade.

Example 4: Elongated Wind Turbine Blade

When loading an elongated or still further oversized elongate cargo item 16, an auxiliary opening or Back Assistance Exit (hatch), generally designated 52, are utilized. An auxiliary cargo door 54 is utilized to close the opening, where possible. For example, the second side 26 of the cylindrical portion 18 of the fuselage 12 defines the auxiliary opening 52 toward the rearward end 22 of the cylindrical portion 18, such that the method of inserting the first elongate cargo item lengthwise into the cargo compartment 14 comprises obliquely- and lengthwise-inserting the first elongate cargo item through the cargo opening 36 from the forward edge 30 and at the acute angle between the first elongate cargo item and the lateral centerline C so as to allow the leading end of the first elongate cargo item to extend through the auxiliary opening 52 until the trailing end is disposed rearwardly of the forward edge 30 of the cargo opening 36; and pivoting the leading and trailing edges of the first elongate cargo item about a medial portion of the first elongate cargo item to align the first elongate cargo item substantially parallel with the lateral centerline C within the cargo compartment 14.

In example implementations where there is a second oversized elongate cargo item, the method comprises translating the first elongate cargo item toward the rearward end 22 and toward the first side 24 of the cylindrical portion 18; inserting the second elongate cargo item lengthwise into the cargo compartment 14 by obliquely- and lengthwise-inserting the second elongate cargo item through the cargo opening 36 from the forward edge 30 and at the acute angle between the second elongate cargo item and the lateral centerline C so as to allow the leading end of the second elongate cargo item to extend through the auxiliary opening 52 until the trailing end is disposed rearwardly of the forward edge 30 of the cargo opening 36; pivoting the leading and trailing edges of the second elongate cargo item about a medial portion of the second elongate cargo item to align the second elongate cargo item substantially parallel with the lateral centerline C within the cargo compartment 14; and translating the first and second elongate cargo items 16 within the cylindrical portion 18 to align the first and second elongate cargo items 16 within the cargo compartment 14.

In one example implementation, such loading of a single oversized cargo item 16 is shown in EXAMPLE 4 and FIG. 10, where the cargo item has a length $l_{cargo}$ that will prevent the item from being loaded into the cargo compartment 14 without the auxiliary opening 52. The auxiliary opening 52 is be arranged opposite from the side of the fuselage 12 that the cargo opening 36 is arranged. The location of the auxiliary opening 52 along the fuselage 12 is based on the angle of loading α.

The auxiliary opening 52 is arranged to cover an area where the leading edge of the wind turbine will intersect with the second side 26 of the elongate cylindrical portion 18 (or whichever side is the side opposite from the side of the elongate cylindrical portion 18 where the cargo opening 36 is arranged). Because of the nature of the geometry and loading angle α values, the auxiliary opening 52 is wide, while a height of the auxiliary opening 52 matches at least a height of standard oversized elongate cargo items 16. To determine a location of the auxiliary opening 52, when the cargo package is moved to the cargo compartment 14 and the leading end has passed through the cargo opening 36, a farthest edge of the auxiliary opening 52 should be bigger than the wind turbine's leading edge.

Many modifications and other implementations of the inventions set forth herein will come to mind to one skilled in the art to which these disclosed implementations pertain having the benefit of the teachings presented in the foregoing descriptions and the associated drawings. Therefore, it is to be understood that implementations of the invention are not to be limited to the specific implementations disclosed and that modifications and other implementations are intended to be included within the scope of the invention. Moreover, although the foregoing descriptions and the associated drawings describe example implementations in the context of certain example combinations of elements and/or functions, it should be appreciated that different combinations of elements and/or functions may be provided by alternative implementations without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. may be used herein to describe various steps or calculations, these steps or calculations should not be limited by these terms. These terms are only used to distinguish one operation or calculation from another. For example, a first calculation may be termed a second calculation, and, similarly, a second step may be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof.

Therefore, the terminology used herein is for the purpose of describing particular implementations only and is not intended to be limiting.

That which is claimed:

1. A cargo aircraft, comprising:
a fuselage defining a longitudinally-extending cargo compartment and including:
an elongate cylindrical portion having a substantially constant outer diameter, longitudinally-opposed forward and rearward ends, and laterally-opposed first and second sides, and
a forward portion engaged with the forward end of the cylindrical portion, the forward portion having a cross-section tapering away from the cylindrical portion toward a lateral centerline,
the fuselage defining a continuous cargo opening to the cargo compartment along the first side, the cargo opening having a first portion extending along the cylindrical portion to a rearward edge and a second portion extending along the forward portion to a forward edge, wherein an increased distance of the forward edge from the forward end of the cylindrical portion allows an elongate cargo item to be obliquely inserted lengthwise through the cargo opening from the forward edge at a decreased acute loading angle between the elongate cargo item and the lateral centerline.

2. The aircraft of claim 1, wherein an increased distance of the rearward edge from the forward end of the cylindrical portion allows the elongate cargo item to be obliquely inserted lengthwise through the cargo opening from the forward edge at a decreased acute loading angle between the elongate cargo item and the lateral centerline.

3. The aircraft of claim 1, wherein the elongate cargo item has opposed leading and trailing ends, and wherein second side of the cylindrical portion of the fuselage defines an auxiliary opening toward the rearward end of the cylindrical portion, the auxiliary opening being arranged so as to allow the leading end of the elongate cargo item to extend therethrough until the trailing end is disposed rearwardly of the forward edge of the cargo opening, such that the elongate cargo item can be pivoted about a medial portion thereof to be aligned substantially parallel with the lateral centerline within the cargo compartment.

4. The aircraft of claim 1, wherein the forward portion of the fuselage defines or includes a portion of a flight deck compartment disposed toward the second side of the fuselage, and wherein the second side of the fuselage defines a flight deck access opening in communication with the flight deck compartment.

5. The aircraft of claim 1, wherein a plane extending laterally through a longitudinal axis of the cylindrical portion of the fuselage defines a floor of the cargo compartment, and wherein the cargo opening defines a lower edge at an intersection between the plane and the first side of the fuselage.

6. The aircraft of claim 5, wherein the cargo opening extends upwardly from the lower edge and arcuately about the fuselage to an upper edge.

7. The aircraft of claim 6, wherein a distance between an intersection of the rearward and lower edges of the cargo opening and an intersection of the upper and forward edges of the cargo opening defines a maximum width of the cargo insertable into the cargo compartment through the cargo opening.

8. The aircraft of claim 6, comprising a cargo door arranged to provide access to the cargo compartment through the cargo opening, the cargo door being hinged about the upper edge of the cargo opening.

9. The aircraft of claim 5, wherein:
a lateral offset distance is defined between a first dimension between the lateral centerline and a first intersection of the rearward and lower edges of the door opening and a second dimension between the lateral centerline and a second intersection between the forward and lower edges of the door opening, the first and second dimensions being perpendicular to the lateral centerline;
a door opening width is defined between the first intersection and the second intersection;
a loading angle is defined between the elongate cargo item and the lateral centerline; and
an effective door opening width normal to the loading angle is defined as a product of the lateral offset distance multiplied by the cosine of the loading angle and added to a product of the door opening width multiplied by the sine of the loading angle.

10. The aircraft of claim 9, wherein the cargo opening extends upwardly from the lower edge and arcuately about the fuselage about a radius from the lateral centerline, wherein the elongate cargo item defines a cargo width, a cargo depth, and a cargo length, and wherein the effective door opening width corresponding to a maximum width of the elongate cargo item receivable by the door opening is defined as a difference between a first product of the cargo length multiplied by a sine of the loading angle and a second product of the cargo depth multiplied by a cosine of the loading angle.

11. The aircraft of claim 10, wherein the loading angle has a maximum of 30 degrees for the elongate cargo item with the cargo length being at least 30 meters and the cargo width being at least 1 meter.

12. A method of loading elongate cargo in an aircraft having a fuselage defining a longitudinally-extending cargo compartment and including an elongate cylindrical portion having a substantially constant outer diameter, longitudinally-opposed forward and rearward ends, and laterally-opposed first and second sides, and a forward portion engaged with the forward end of the cylindrical portion, the forward portion having a cross-section tapering away from the cylindrical portion toward a lateral centerline, the method comprising:
inserting a first elongate cargo item lengthwise into the cargo compartment obliquely through a continuous cargo opening defined by the fuselage along the first side, the cargo opening having a first portion extending along the cylindrical portion to a rearward edge and a second portion extending along the forward portion to a forward edge, the oblique lengthwise insertion of the first elongate cargo item through the cargo opening being initiated from the forward edge at an acute angle between the first elongate cargo item and the lateral centerline.

13. The method of claim 12, wherein inserting the first elongate cargo item lengthwise into the cargo compartment comprises obliquely- and lengthwise-inserting the first elongate cargo item through the cargo opening from the forward edge at a decreased acute angle between the first elongate cargo item and the lateral centerline in response to an increased distance of the forward edge of the cargo opening from the forward end of the cylindrical portion.

14. The method of claim 12, wherein inserting the first elongate cargo item lengthwise into the cargo compartment comprises obliquely- and lengthwise-inserting the first elongate cargo item through the cargo opening from the forward edge at a decreased acute angle between the first elongate cargo item and the lateral centerline in response to an increased distance of the rearward edge from the forward end of the cylindrical portion.

15. The method of claim 12, wherein the first elongate cargo item has opposed leading and trailing ends, and wherein inserting the first elongate cargo item lengthwise into the cargo compartment comprises:
  obliquely- and lengthwise-inserting the first elongate cargo item through the cargo opening from the forward edge and at the acute angle between the first elongate cargo item and the lateral centerline until the trailing end is disposed rearwardly of the forward edge of the cargo opening; and
  pivoting the leading and trailing edges of the first elongate cargo item about a medial portion of the first elongate cargo item to align the first elongate cargo item substantially parallel with the lateral centerline within the cargo compartment.

16. The method of claim 15, wherein a second elongate cargo item has opposed leading and trailing ends, and wherein the method comprises:
  translating the first elongate cargo item toward the rearward end and toward the first side of the cylindrical portion;
  inserting the second elongate cargo item lengthwise into the cargo compartment by obliquely- and lengthwise-inserting the second elongate cargo item through the cargo opening from the forward edge and at the acute angle between the second elongate cargo item and the lateral centerline until the trailing end is disposed rearwardly of the forward edge of the cargo opening;
  pivoting the leading and trailing edges of the second elongate cargo item about a medial portion of the second elongate cargo item to align the second elongate cargo item substantially parallel with the lateral centerline within the cargo compartment; and
  translating the first and second elongate cargo items within the cylindrical portion to align the first and second elongate cargo items within the cargo compartment.

17. The method of claim 12, wherein the first elongate cargo item has opposed leading and trailing ends, wherein second side of the cylindrical portion of the fuselage defines an auxiliary opening toward the rearward end of the cylindrical portion, and wherein inserting the first elongate cargo item lengthwise into the cargo compartment comprises:
  obliquely- and lengthwise-inserting the first elongate cargo item through the cargo opening from the forward edge and at the acute angle between the first elongate cargo item and the lateral centerline so as to allow the leading end of the first elongate cargo item to extend through the auxiliary opening until the trailing end is disposed rearwardly of the forward edge of the cargo opening; and
  pivoting the leading and trailing edges of the first elongate cargo item about a medial portion of the first elongate cargo item to align the first elongate cargo item substantially parallel with the lateral centerline within the cargo compartment.

18. The method of claim 17, wherein a second elongate cargo item has opposed leading and trailing ends, and wherein the method comprises:
  translating the first elongate cargo item toward the rearward end and toward the first side of the cylindrical portion;
  inserting the second elongate cargo item lengthwise into the cargo compartment by obliquely- and lengthwise-inserting the second elongate cargo item through the cargo opening from the forward edge and at the acute angle between the second elongate cargo item and the lateral centerline so as to allow the leading end of the second elongate cargo item to extend through the auxiliary opening until the trailing end is disposed rearwardly of the forward edge of the cargo opening;
  pivoting the leading and trailing edges of the second elongate cargo item about a medial portion of the second elongate cargo item to align the second elongate cargo item substantially parallel with the lateral centerline within the cargo compartment; and
  translating the first and second elongate cargo items within the cylindrical portion to align the first and second elongate cargo items within the cargo compartment.

19. The method of claim 12, wherein a plane extending laterally through a longitudinal axis of the cylindrical portion of the fuselage defines a floor of the cargo compartment, wherein the cargo opening defines a lower edge at an intersection between the plane and the first side of the fuselage, wherein the cargo opening extends upwardly from the lower edge and arcuately about the fuselage to an upper edge, and wherein inserting the first elongate cargo item lengthwise into the cargo compartment obliquely through the cargo opening comprises obliquely- and lengthwise-inserting the first elongate cargo item, having a maximum width defined by a distance between an intersection of the rearward and lower edges of the cargo opening and an intersection of the upper and forward edges of the cargo opening, into the cargo compartment through the cargo opening.

20. The method of claim 19, comprising accessing the cargo compartment through the cargo opening, by way of a cargo door hinged about the upper edge of the cargo opening.

* * * * *